March 18, 1930.   C. E. BIRCHER   1,751,388
POULTRY FEEDER
Filed March 4, 1927
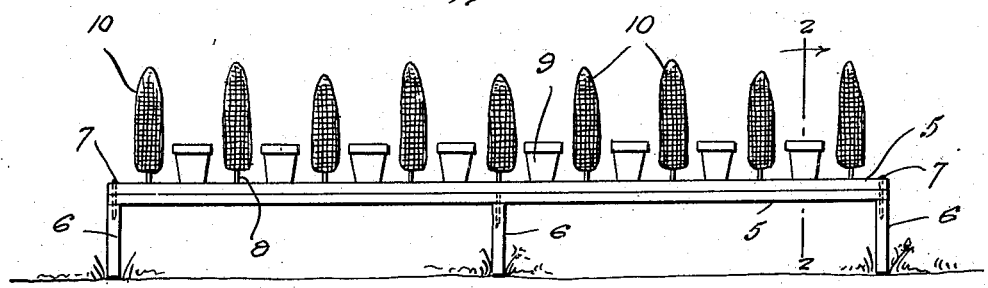
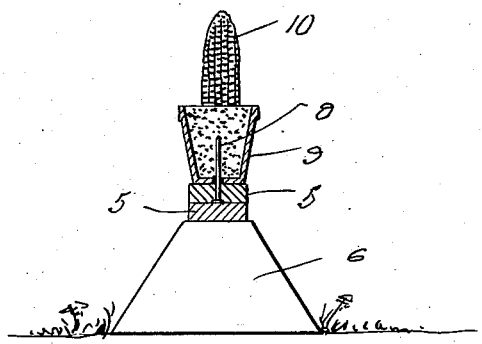
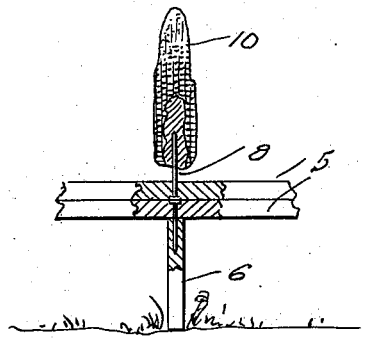
Inventor
Charles E. Bircher
By Clarence A. O'Brien
Attorney Patented Mar. 18, 1930

1,751,388

UNITED STATES PATENT OFFICE

CHARLES E. BIRCHER, OF HEDRICK, IOWA

POULTRY FEEDER

Application filed March 4, 1927. Serial No. 172,904.

This invention relates to new and useful improvements in poultry feeding devices and has for its primary object to provide a stand construction that is adapted for the support of ears of corn or loose feed receptacles, or both.

A further and important object resides in the provision of a poultry feeding device of this character that is of unusually simple construction, and design and thus inexpensive of manufacture, but yet highly successful in the supporting of poultry feed.

With the foregoing and other objects in view as the nature of the invention will be better understood, the same comprises the novel form, combination and arrangement of parts hereinafter more fully described, shown in the accompanying drawings and claimed.

In the accompanying drawings wherein like numerals of reference indicate corresponding parts throughout the views:

Figure 1 is a side elevation of my improved poultry feeder.

Figure 2 is a section taken substantially upon the line 2—2 of Figure 1, and

Figure 3 is a fragmentary view partly in longitudinal cross section for disclosing more clearly the corn ear or loose feed receptacle supporting pin, one of the main features of the present invention.

Now having particular reference to the drawing, my novel poultry feeder consists of a pair of superposed narrow boards 5—5 supported at their ends and at their center by suitable legs 6 the two end ones of which are preferably secured by nails 7—7 driven through both boards, while the center leg is secured to the lower board also by a nail as indicated in Figure 3. However, I do not desire to be limited in the specific manner of attaching these legs to said boards as this is not material in carrying out the present invention.

Projecting vertically from the top board 5 throughout its entire length are longitudinally spaced pins 8 preferably in the form of headed nails driven upwardly through the board as clearly disclosed in Figures 2 and 3.

In carrying out this invention I provide containers 9 such as flower pots, cans and the like having holes in their bottom walls for engagement over predetermined ones of the pin and within which is deposited loose grain or other feed as in Figure 2. Furthermore, these pins 8 serve as a means for permitting ears of corn 10 to be impaled thereon and preferably each alternate pin supports an ear of corn, while the remaining pins support the loose feed containers as disclosed in Figure 1.

It will thus be seen that I have provided a highly novel, simple and efficient poultry feeder that is well adapted for all the purposes heretofore designated, and even though I have herein shown and described the invention as consisting of certain detail structural elements it is nevertheless to be understood that some changes may be made therein without affecting the spirit and scope of the appended claims.

Having thus described the invention, what I claim is:—

1. In a poultry feeding device of the class described, a horizontal base board, ground supporting legs therefor, vertically projecting spaced pins extending through the board at spaced intervals throughout the length of the base board, and feed receiving receptacles removably disposed over the respective projecting pins for rest upon the upper face of the base board.

2. In a poultry feeding device of the class described, a pair of identical elongated boards arranged in superimposed relation throughout their entire length, said boards being secured together to provide a unitary structure, ground engaging supporting legs secured to the bottom face of the lowermost board, a series of headed pins extending upwardly through the uppermost boards at spaced intervals, the heads being disposed against the bottom face of the uppermost board, and feed receiving receptacles removably disposed over the respective pins for rest upon the upper face of the uppermost board.

In testimony whereof I affix my signature.

CHARLES E. BIRCHER.